United States Patent [19]

Ball

[11] Patent Number: 4,595,872
[45] Date of Patent: Jun. 17, 1986

[54] COMPUTER-ATTACHED UNINTERRUPTABLE DC POWER SUPPLY

[76] Inventor: Newton E. Ball, 5625 Kearny Villa Rd., San Diego, Calif. 92123

[21] Appl. No.: 716,907

[22] Filed: Mar. 28, 1985

Related U.S. Application Data

[63] Continuation-in-part of Ser. No. 536,752, Sep. 28, 1983.

[51] Int. Cl.⁴ .............................. H02J 7/00; H02J 9/00
[52] U.S. Cl. ........................................ 320/13; 307/66; 320/48
[58] Field of Search .................. 320/13, 14, 39, 48, 320/44, 45; 307/46, 66

[56] References Cited

U.S. PATENT DOCUMENTS

| | | | |
|---|---|---|---|
| 4,237,385 | 12/1980 | Jurgens et al. | 320/13 X |
| 4,315,162 | 2/1982 | Ferguson | 307/66 |
| 4,354,118 | 10/1982 | Spencer | 320/13 X |
| 4,400,661 | 8/1983 | Duley | 307/66 X |

Primary Examiner—R. J. Hickey
Attorney, Agent, or Firm—Charmasson & Holz

[57] ABSTRACT

A DC power supply comprising a sealed lead-acid battery, a charging regulator, a discharge pass element, an output power switch for disconnected the power supply from the computer and four light-emitting diode indicators which display the condition and trend of the battery charge state. The power supply may be permanently attached to an Apple IIc brand computer without marring the computer's plastic housing by means of tabs on upper and lower projections of the power supply housing which interlock with slots on the upper and lower surfaces of the computer's housing. The power supply also features an electronic "sleep" switch which not only prevents battery drain when the power output switch is turned off, but also prevents deep discharge of the battery and possible damage to the powered equipment when battery voltage drops below a preset value while the output switch is turned on and adequate voltage from the power line is unavailable. The sleep switch disables all of the power supply's circuitry save an input-deactivated driver transistor and a CMOS logic circuit required for both disabling and reawakening the circuitry. A one-shot awakening feature is triggered for approximately one second whenever the output power switch is closed. If the battery is adequately charged, the power supply remains awake; if not, it reverts to sleep. When connected to an adequate DC source, the unit functions as an on-line uninterruptible power supply; when disconnected, the computer becomes a battery-powered portable.

10 Claims, 7 Drawing Figures

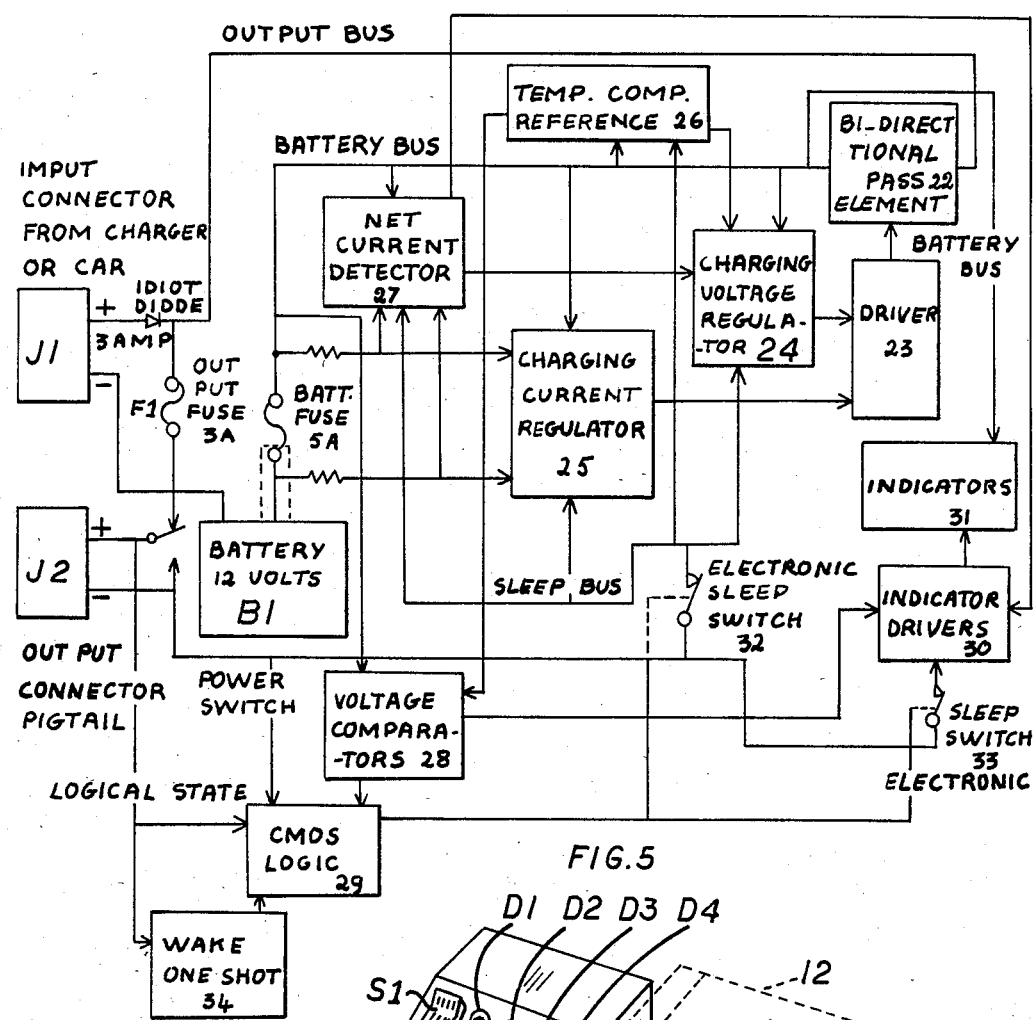
FIG.5
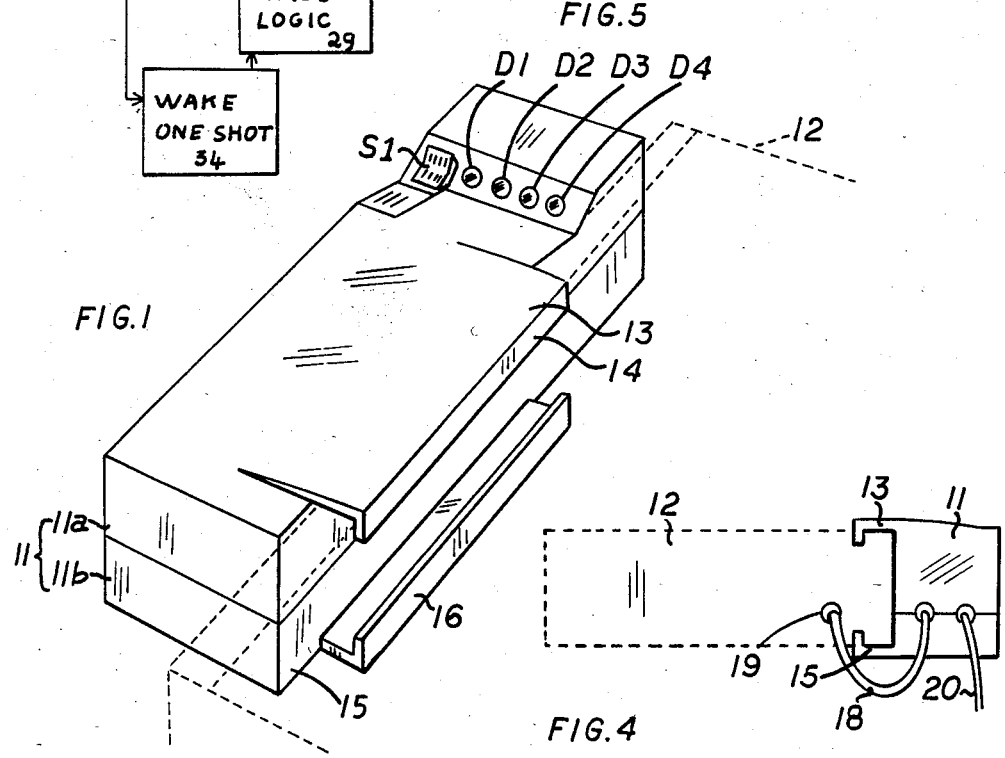
FIG.1
FIG.4

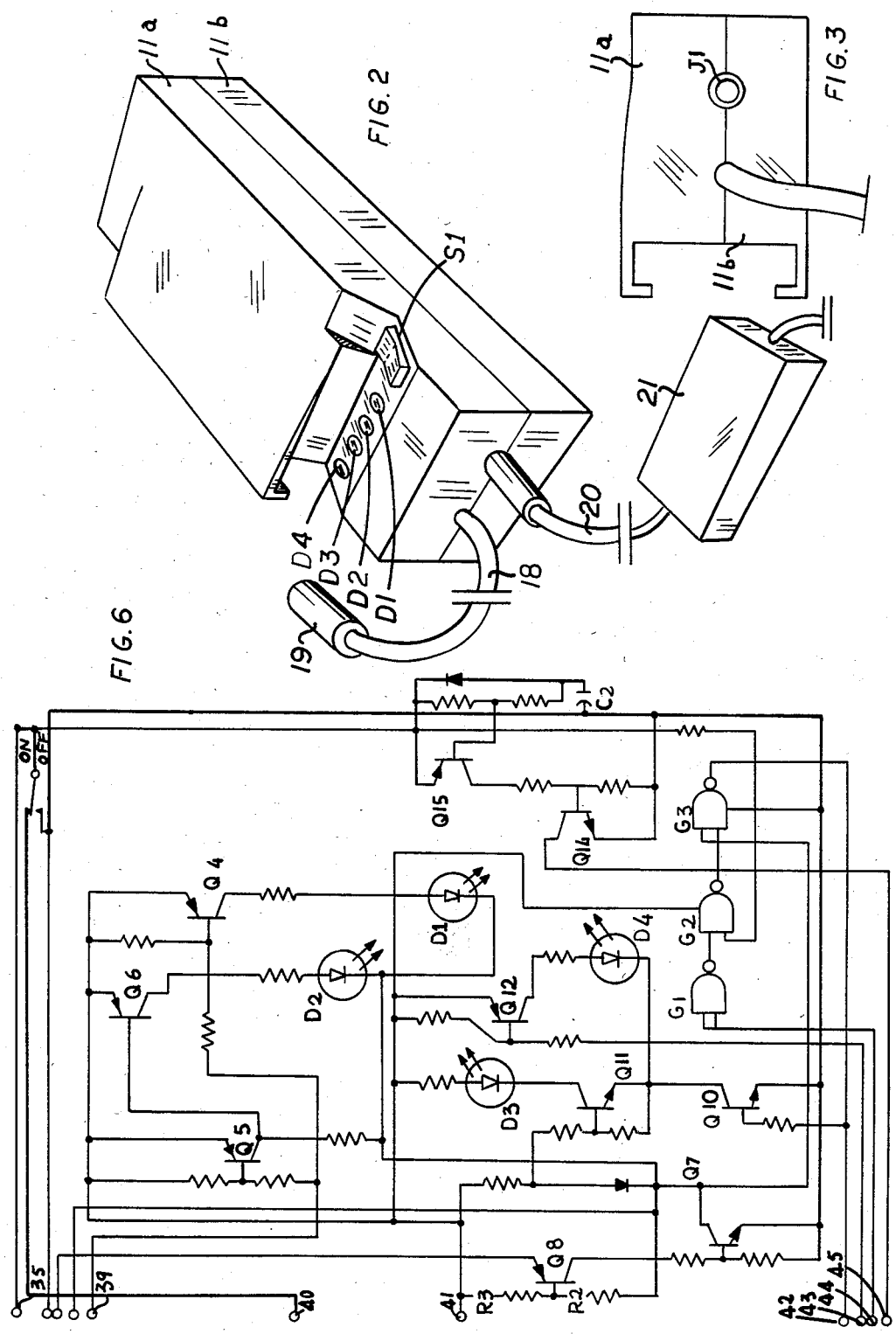

COMPUTER-ATTACHED UNINTERRUPTABLE DC POWER SUPPLY

This is a continuation-in-part of my prior application Ser. No. 06/536,752 which was filed on Sept. 28, 1983.

FIELD OF THE INVENTION

The present invention relates to uninterruptible power supplies, battery chargers and "sleep circuits" for minimizing power drain.

BACKGROUND OF THE INVENTION

The Apple IIc brand computer is a highly-compact version of the ubiquitous Apple II brand series of personal computers which, through Apple Computer's marketing wizardry, has become the defacto standard in personal computers for educational use. The Apple IIc, avaiable with a flat, low-energy-consumption, liquid-crystal-display screen, comes complete with a built-in, half-height 5¼-inch floppy disk drive. The only feature which the Apple IIc lacks to become a true portable is a rechargeable, battery-driven power supply.

The Apple IIc computer is normally powered by a free-standing power source which converts 115-volt AC line current to 15 volts DC which is then fed into the rear of the computer. Like all computers dependent on AC current from the power line, the Apple IIc is, in its standard form, vulnerable to interruptions in the supply of AC current. Although the read-write head of the DC-powered floppy disk drive of the Apple IIc is not subject to loss of control resulting in a corruption of data on the diskette tracks over which it hovers when the power either fails or is restored, a loss of power for a fraction of a second—or even a substantial voltage drop—can cause unrecoverable data loss from dynamic memory. Given this vulnerability to power interruptions, an uninterruptible power supply would be very beneficial.

A problem of uninterruptible power supplies powered by batteries is that a computer user may easily discharge the batteries beyond the optimum discharge point, resulting in greatly-shortened battery life and possible damage to the computer. Ideally, an uninterruptible power supply would alert the user to a low-voltage situation, provide him with enough time to save his work product, and then automatically cut off the power to the computer.

SUMMARY OF THE INVENTION

The primary objective of the present invention is to provide a rechargeable, battery-driven uninterruptible power supply for the Apple IIc computer, or any other electronic device which operates from a DC power supply. The invention consists of a sealed lead-acid battery, a charging regulator and a discharge pass element together with connectors, an on-off switch, and four light-emitting diodes which indicates charge trend and condition of the battery. The invention treats the the free-standing Apple AC-DC power sources and any 12-volt automotive electrical system as interchangeable sources of powder for both operation of the computer and recharge of the battery.

A secondary objective of the present invention is to prevent deep discharge of the battery by cutting power to the load and disabling the charge-regulating, voltage-regulating and light-emitting-diode display circuits within the power supply. This is accomplished by applying the final output from a sequential logic circuit comprised of NAND gates to the base electrodes of the transistors which act as electronic switches to the charge-regulating and indicator display circuits.

A third objective of the invention is to package the power supply so that it may be permanently attached to the Apple IIc computer housing without marring it. This final objective is accomplished by splitting the power supply case in two halves, each of which incorporates a projection having a rectangular tab. The tab on the projection of the upper case half fits snugly into a rectangular groove on the upper surface of the computer housing, while the tab on the projection of the lower case half fits snugly into a rectangular groove on the lower surface of the computer housing. The tabs remain locked in said grooves when both case halves are secured together.

BRIEF DESCRIPTION OF THE DRAWINGS

FIG. 1 is a frontal-side perspective view of the power supply housing;

FIG. 2 is a rear-side perspective view of the power supply housing;

FIG. 3 is a rear elevational view of the power supply housing;

FIG. 4 is a rear elevational view of the power supply connected to an Apple IIc computer (the outline of the latter being shown in broken lines);

FIG. 5 is a block diagram of the circuitry of the power supply; and

FIGS. 6 and 7 are a schematic of the circuitry used in the power supply.

DESCRIPTION OF THE PREFERRED EMBODIMENT OF THE INVENTION

Figure 7:
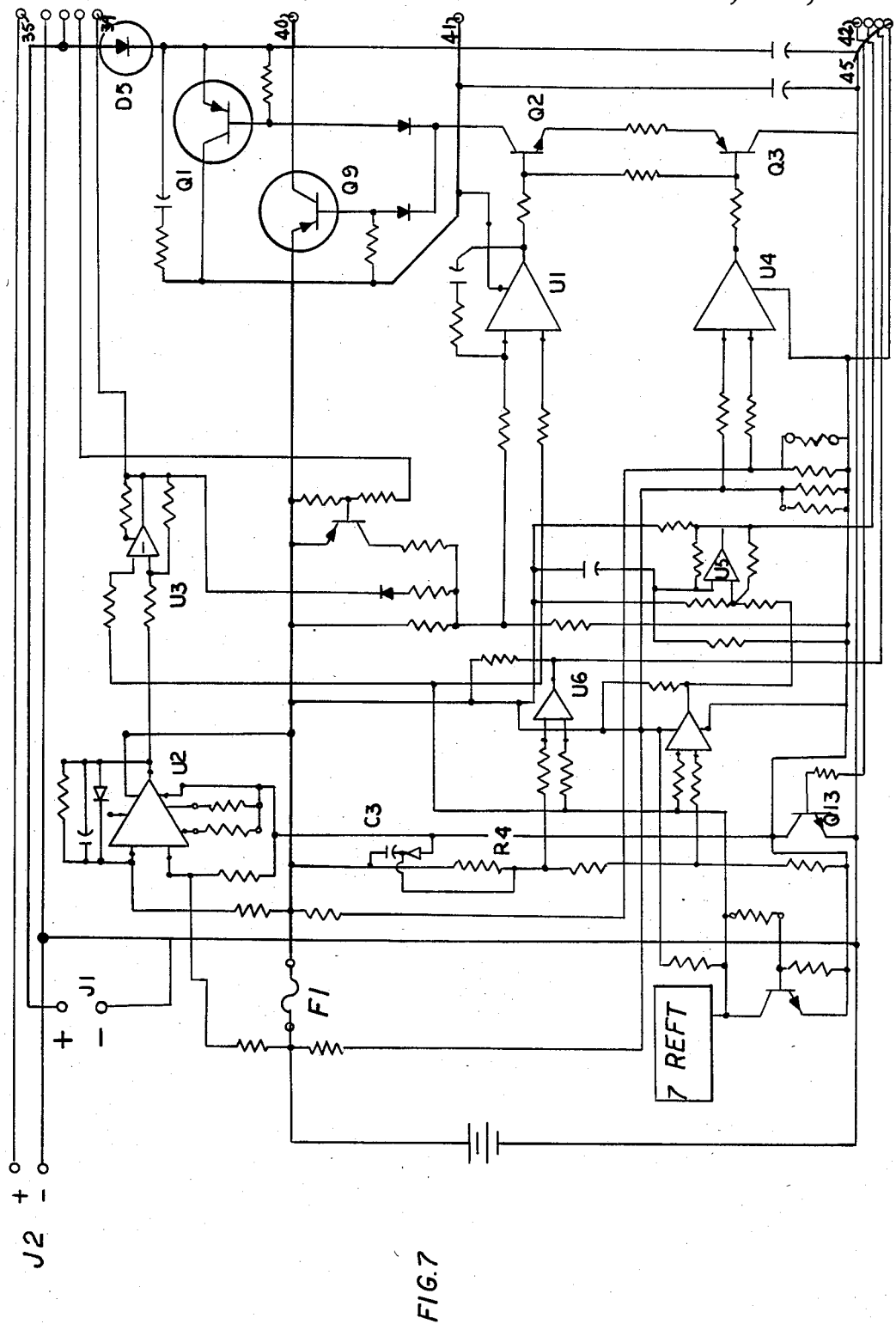

Referring now to FIG. 1 of the drawings, the power supply is packaged in a high-impact plastic case 11 having a height approximately equal to the height of the Apple IIc computer housing 12. Case 11 is comprised of a case upper section 11a and a case lower section 11b. The case upper section 11a incorporates a projection 13 having a rectangular tab 14, while the case lower section 11b incorporates a projection 15 having a second rectangular tab 16. The tab 14 on projection 13 of upper case half 11a fits snugly into a rectangular groove on the upper surface of the computer housing 12, while the tab 16 on projection 15 of lower case half 11b fits snugly into a rectangular groove on the lower surface of the computer housing 12. The tabs remain locked in said grooves when both case halves are secured together at the corners by means of four self-tapping screws (not shown in the drawing). The case 11 encloses a sealed lead-acid battery and a pair of printed circuit boards which carry the regulating, logic, sleep, wake and charge-status display circuitry, output power switch S1, power input jack J1 (visible in FIG. 3), and four charge-status display diodes D1, D2, D3 and D4, which project through case 11 so as to be visible to the computer operator.

Referring now to FIG. 2, a power cable 18 with its associated plug 19 extends from the rear of case 11 and may be plugged directly into the power input jack on the Apple IIc computer. The cable 20 of the Apple IIc free-standing AC-DC power source 21 may be plugged directly into power supply input jack J1 (shown in FIG. 3), which is accessible from the rear of case 11.

The block disgram of FIG. 5 provides a functional overview of the power supply. The power supply is connected to the Apple AC-DC power supply at jack J1. Jack J2 provides the output to the load (the computer). Charging and discharging of 12-volt battery B1 is controlled by bi-directional pass element 22. Driver 23 controls current flow through bi-directional pass element 22. Driver 23 has two components, one of which is controlled by charging-voltage regulator 24, the other controlled by charging-current regulator 25. Charging-voltage regulator 24, on one hand, compares battery-bus voltage with temperature-compensated reference voltage 26. Net-current detector 27 determines the battery "float" voltage limit by measuring the voltage drop across battery fuse F1. When the charging current is low (i.e. when the battery is fully charged), net-current detector 27 boosts the voltage perceived as the battery-bus voltage by charging-voltage regulator 24. Charging-voltage regulator 24 responds by turning down its associated driver component, thereby reducing the charging current through pass element 22 so as to maintain the battery voltage at a reduced "float" level. Charging-current regulator 25, on the other hand, measures the current flowing into battery B1 by measuring the voltage drop across battery fuse F1. By controlling its component of drive 23, charging-current regulator 25 is able to regulate maximum battery charging current. Regulation of maximum charging current is esential because the current output from the Apple IIc AC-DC power source is insufficient to simultaneously power the computer and charge the battery at its maximum charge rate. Voltage comparators 28 provide inputs for CMOS logic 29 and for indicator drivers 30. Indicator drivers 30 control indicators 31, which inform the computer operator of the status of the battery (i.e. whether it is fully charged, being charged from a 12-volt DC source, being discharged through the load, or below one-eight of full charge). The output from CMOS Logic 29 opens a pair of electronic sleep switches 32 and 33 when the power supply is disconnected from a 12-volt power source and when battery voltage has dropped below approximately 10.8 volts, or when the power supply is disconnected from a 12-volt DC power source and the output power switch S1 is turned off. Sleep switch 32 deactivates reference 26, net-current detector 27, charging voltage regulator 24 and charging-current regulator 25, while sleep switch 33 deactivates indicator drivers 30. When power switch S1 is closed, wake one-shot 34 allows CMOS logic 29 to be activated for approximately one second, irregardless of the battery-bus voltage level, while it determines whether or not the battery charge level is sufficient (i.e. battery voltage is greater than 10.8 volts). If the battery charge level is low, sleep switches 32 and 33 return to the open state.

A more complete understanding of the operation of the power supply may be gained by referring to the circuit diagrams of FIGS. 6 and 7, which are electrically interconnected at the connector points along one edge of each diagram. The connector points are consecutively numbered 35 through 45. When jack J1 is powered from either the Apple IIc power source or a 12-volt automotive electrical system, the invention functions as an uninterruptible power supply. With power switch S1 in the "ON" position, rectified AC current from the Apple IIc AC-DC power source is passed by diode D5 and switch S1 to the computer's power input jack. At the same time, transistor Q1 determines the rate of charge of battery B1. The voltage applied to the base of transistor Q1 is controlled by transistors Q2 and Q3, which act as variable resistors on a path to ground. Base drive voltage to transistor Q2 is controlled by operational amplifier U1, which compares battery voltage to a 7-volt, temperature-compensating reference 7REFT. As battery voltage rises as it is charged, the voltage output from U1 falls, decreasing base drive voltage to transistor Q2, with a consequent decrease in base drive voltage to transistor Q1.

Operational amplitifer U2 functions as a net current amplifier by sensing the voltage drop across fuse F1. The output of U2 is fed to comparator U3, where it is compared with 7REFT. A high charging current produces a low voltage output from U2, which, in turn produces a low voltage output from operational amplifier U3. This lower output reduces the voltage which U1 senses as the battery voltage; Q2, therefore, maintains a higher charge rate through transistor Q1. At low charge rates (i.e. when the battery is approaching its fully-charged state, the output of U2 goes high, resulting in a high output from U3). This high output causes the voltage sensed by U1 as the battery voltage to appear high; U1, therefore, maintains only enough current charge through Q1 to sustain a lowered "float" voltage.

The output from U3, in addition to determining the battery float voltage, also controls the drivers for light-emitting-diode D1, which indicates that the battery is being charged, and light-emitting diode D2, which indicates that the battery is fully charged. When the output of U3 is low, transistor Q4 is turned on, providing a current path to the positive terminal of diode D1; a low output from U3 also turns on transistor Q5, which, in turn, pulls the base of transistor Q6 high, thus preventing current from flowing to the positive terminal of diode D2. Conversely, when the output of U3 is high, the current path through transistor Q4 is cut, and the path through transistor Q6 is enabled.

The common ground path for diodes D1 and D2 is through transistor Q7, which is turned on by a current path through transistor Q8. Current flows through transistor Q8 only when the voltage applied to its base is (i.e. the battery voltage) is lower than the voltage applied to its emitter. This conductive state of transistor Q8 occurs when a power source of adequate voltage is connected to jack J1.

The voltage applied to the base of transistor Q3, on the other hand, is controlled by comparing amplifier U4, which functions as a maximum charging current regulator by measuring the voltage drop across fuse F1 which functions as a series resistor in the charging circuit. The voltage drop across fuse F1 increases as the current flowing to the battery increases. When this voltage drop exceeds the offset in the bridge circuit at the input of U4, the output voltage from U4 is reduced, which reduces current flow through Q3, which, in turn, reduces the flow of charging current through Q1.

When the power source is disconnected from input jack J1 and switch S1 is on, battery B1 discharges to the load (the computer) through transistor Q9. The voltage applied to the base of transistor Q9 is controlled by the same components that control transistor Q1. As long as battery voltage remains above approximately 10.8 volts, the sleep circuitry maintains a base drive voltage to transistor 10, which provides a common ground path for light-emitting diodes D3 and D4. With the current path through transistor Q10 enabled, and transistor Q7 switched off to enable battery voltage to pull the base of transistor Q11 high, diode D3 will be be lit to indicate that the battery is discharging. This discharging state occurs when the power source is disconnected from jack J1. When battery B1 is discharged to approximately one-eighth of its full-charge capacity, transistor Q12 is pulled low at approximately one-second intervals by the relaxator circuit comprised of operational amplifier U5 and compactor C1, causing diode D4 to blink if the ground path through transistor Q10 is enabled. This feature provides the computer operator with ample time to save information located in dynamic memory on a diskette before battery voltage has dropped to approximately 10.8 volts, at which point the majority of the power supply circuitry will automatically be disabled by electronic "sleep" switches, with power to the computer being cut off.

The electronic "sleep" switches Q10 and Q13 disable the light-emitting diode display circuitry, the charging-voltage regulation circuitry, the charging-current regulation circuitry and the net-current amplification circuitry whenever the power supply is disconnected from a 12-volt power source (or the voltage of a connected power source has dropped below a value sufficient to charge the battery) and battery voltage has dropped below approximately 10.8 volts, or power switch S1 is "off". The 10.8-volt power cutoff point was selected to prevent deep discharge of the battery and also possible damage to the computer. First, when no adequate 12-volt power source is connected to the power supply, transistor Q8 does not conduct, which results in the ground return for indicator diodes D1 and D2 through transistors Q7 being turned off. The output from sequential NAND gates, G1, G2 and G3 determines the base voltage applied to transistors 10 and 13. The common ground path for diodes D3 and D4 is disconnected whenever a low signal from the sequential NAND-gate circuit pulls the base of transistor Q10 low. A low output from the sequential NAND-gate circuit also disables the charging-voltage regulation circuitry, the charging-current regulation circuitry and the net-current amplification circuitry by turning off transistor Q13.

The input for NAND gate G1 is the output of operational amplifier U6, which compares the voltage of 7REFT with the voltage of the battery. The voltage appears momentarily higher than its true value due to the inclusion of capacitor C2 on the other side of resistor R4. The reason for this momentary false reading will be explained later when the "wake one shot" feature is discussed. NAND gate G2 receives its inputs from gate G1 and the load side of switch S1, respectively. Gate G3 receives its inputs from gate G2 and the ground path for diodes D1 and D2. When a 12-volt DC power source is connected to jack J1, transistor Q7 is switched on, providing both a ground path for diodes D1 and D2 and a low input signal for gate G3; when the AC-DC power source is disconnected, the input to gate G3 is pulled high by battery voltage fed through series resistors R2 and R3.

The "wake one shot" feature allows the power supply to activate the charge regulation circuitry for roughly one second after power switch S1 is turned on. During this interval, while capacitor C2 is charging, transistor Q14 is switched on by current flowing through transistor Q15, and provides a path to ground alternate to that provided by transistor Q13. The alternate ground path reactivates the 7-volt reference 7REFT so that operational amplifier U6 may compare this voltage with the battery voltage. In order to produce the low signal required for the sequential NAND gate circuit to "awaken" the dormant circuitry, operational amplifier U6 must perceive a a battery voltage greater than approximately 10.8 volts. Even when the battery voltage has dropped well below this point, the discharge of capacitor C3 produces a momentary voltage that is considerably higher than the battery voltage read through resistor R4. This momentary increase allows the measurement circuitry to remain "awake" long enough to make a definitive measurement of battery voltage while the effect of capacitor C2 dissipates. In the awakened state, a ground path is once again established through transistor 13. However, if the battery voltage is below 10.8 volts, the charge-regulation and display circuitry revert to sleep.

While the preferred embodiment of the invention has been described, other embodiment may be devised and modifications may be made thereto without departing from the spirit of the invention and the scope of the appended claims.

What is claimed is:

1. In combination with an electronic device operable from a DC-voltage source, an apparatus for maintaining the operation of the device in case of failure or temporary absence of the DC-voltage source, which comprises:

a rechargeable battery having a nominal output voltage substantially equivalent to the DC voltage source;

means for controlling the charging of the battery from the DC voltage source;

means for regulating the discharge of the battery into the device;

means for indicating the charge and discharge state of the battery;

means for sensing the states of the DC voltage source;

means responsive to said means for sensing, for disabling said means for controlling and said means for indicating in the absence or failure of the DC-voltage source when either said apparatus is electrically disconnected from said device, or the voltage of said battery drops below a set value, in order to minimize the current drain from the battery; and means responsive to said means for sensing, for reactivating said means for controlling and said means for indicating when the presense of the DC-voltage source is restored.

2. The apparatus of claim 1 wherein said means for sensing comprises:

means for comparing the voltage of said battery to a reference;

means for sensing the presense or absence of said DC-voltage source; and means for sensing whether or not said apparatus is powering said device.

3. The apparatus of claim 2 which further comprises means for momentarily reactivating said means for comparing when said device is reconnected electrically to said apparatus, so that said means for comparing can determine whether battery charge is adequate to power said means for controlling and said means for indicating, said means responsive to said means for sensing either maintaining said means for controlling and said means for indicating reactivated in a reactivated state if battery charge is adequate, or redisabling said means for controlling and said means for indicating if it is not.

4. The apparatus of claim 3 wherein said means for momentarily reactivating comprises:

a bipolar transistor which, when conducting, provides a current path to said means for comparing alternate to the one disabled by said means responsive to said means for sensing;

a capacitor connected in parallel with the base of said bipolar transistor, which, while being charged from said battery, maintains the proper bias at said base for said bipolar transistor to conduct.

5. The apparatus of claim 4 wherein said means for comparing said voltage comprises a stabilized voltage reference and means for comparing the voltage potential between the terminals of the battery with said voltage reference.

6. The apparatus of claim 5 wherein said means for disabling comprises:
a logic matrix;
the inputs to said logic matrix being;
a signal from said means for comparing,
a signal from said means for sensing the presense or absense of said DC-voltage source, and
a signal from said means for sensing whether or not said apparatus is powering said device; the output signal from said logic matrix being indicative of either a "sleep" condition or an "awake" condition; and means responsive to said output signal from said logic matrix for removing power from said means for controlling and said means for indicating.

7. The apparatus of claim 6 wherein said means responsive to the output comprises at least one switching transistor, the base or bases of said at least one switching transistor being connected to the output of said logic matrix.

8. The apparatus of claim 7 which further comprises:
an enclosure having a height commensurate with the height of said device;
said enclosure being shaped to mount against one side of said device and having means for releaseably attaching itself to said device without affecting the integrity of said device.

9. The apparatus of claim 8 wherein said means for releaseably attaching comprises a pair of spaced-apart projections extending over part of the top and bottom of said device from the upper and lower sections of said enclosure.

10. The apparatus of claim 9 wherein said device is a microprocessor packaged into a brief-case-sized housing having a series of front to back grooves on its top and bottom panels and said projections having tabs which are located, shaped and dimensioned to shapingly engage into said grooves.

* * * * *